United States Patent
Schwartz (10) Patent No.: US 10,339,510 B2
(45) Date of Patent: Jul. 2, 2019

(54) TWO-PORTION CASH-DISPENSING MACHINES

(71) Applicant: Global Payments Gaming Services Inc., Las Vegas, NV (US)

(72) Inventor: Andrew J. Schwartz, Las Vegas, NV (US)

(73) Assignee: Global Payments Gaming Services, Inc., Las Vegas, NV (US)

( * ) Notice: Subject to any disclaimer, the term of this patent is extended or adjusted under 35 U.S.C. 154(b) by 360 days.

(21) Appl. No.: 15/414,743

(22) Filed: Jan. 25, 2017

(65) Prior Publication Data

US 2017/0213199 A1   Jul. 27, 2017

Related U.S. Application Data

(60) Provisional application No. 62/322,818, filed on Apr. 15, 2016, provisional application No. 62/286,995, filed on Jan. 26, 2016.

(51) Int. Cl.
*G06Q 20/18* (2012.01)
*G07F 19/00* (2006.01)
(Continued)

(52) U.S. Cl.
CPC .......... *G06Q 20/18* (2013.01); *G07D 11/00* (2013.01); *G07D 11/26* (2019.01); *G07F 19/203* (2013.01);
(Continued)

(58) Field of Classification Search
None
See application file for complete search history.

(56) References Cited

U.S. PATENT DOCUMENTS

| | | | | |
|---|---|---|---|---|
| 7,340,415 B1* | 3/2008 | Gasper | ............... | G06Q 20/1085 705/43 |
| 8,328,085 B1* | 12/2012 | Shirah | ................... | G06Q 30/04 235/379 |

(Continued)

OTHER PUBLICATIONS

Keisha Stewart, Automated Teller Machines Add More Costs for Customers 'There Are a Number of Free Choices Still Available', May 18, 2001, The Roanoke Times, A9. (Year: 2001).*

(Continued)

*Primary Examiner* — Kito R Robinson
*Assistant Examiner* — Abdulmajeed Aziz
(74) *Attorney, Agent, or Firm* — Mendelsohn Dunleavy, P.C.; Steve Mendelsohn (57) ABSTRACT

In one embodiment, a two-portion cash-dispensing machine has a first secure portion that receives paper currency during bill-breaking operations and vouchers during voucher-redemption operations and a second secure portion that dispenses paper currency. Physical access to the first secure portion is restricted to authorized first agents, and physical access to the second secure portion is restricted to authorized second agents. Physical access to the first secure portion by an authorized first agent does not inherently provide physical access to the second secure portion by the authorized first agent, and vice versa. In one application, two different business entities are respectively responsible for maintaining the two different secure portions, and the machine communicates information associated with requests for transfers of funds from a bank account of the first entity to a bank account of the second entity to reimburse the second entity for bill-breaking and voucher-redemption operations.

15 Claims, 3 Drawing Sheets

US 10,339,510 B2
Page 2

(51) Int. Cl.
*G07D 11/00* (2019.01)
*G07D 11/26* (2019.01)
*G06Q 20/04* (2012.01)
*G07D 11/245* (2019.01)
*G07F 17/32* (2006.01)
*G07D 11/20* (2019.01)
*G07D 11/34* (2019.01)
*G07D 1/04* (2006.01)
*G06Q 20/10* (2012.01)

(52) U.S. Cl.
CPC ............ *G06Q 20/04* (2013.01); *G06Q 20/10* (2013.01); *G07D 1/04* (2013.01); *G07D 11/20* (2019.01); *G07D 11/245* (2019.01); *G07D 11/34* (2019.01); *G07F 17/3246* (2013.01); *G07F 19/202* (2013.01)

(56) References Cited

U.S. PATENT DOCUMENTS

| | | | | |
|---|---|---|---|---|
| 8,510,222 | B2* | 8/2013 | Bachrany | G06Q 40/02 705/35 |
| 8,640,945 | B1* | 2/2014 | McCormick | G07D 1/02 235/379 |
| 9,129,294 | B2* | 9/2015 | Yahn | G06Q 30/0237 |
| 2002/0082962 | A1* | 6/2002 | Farris | G06Q 30/06 705/35 |
| 2005/0182681 | A1* | 8/2005 | Bruskotter | G06Q 20/204 705/15 |
| 2007/0151827 | A1* | 7/2007 | Brandstrom | G07D 1/02 194/206 |
| 2010/0131407 | A1* | 5/2010 | Folk | G06Q 20/10 705/39 |
| 2012/0223136 | A1* | 9/2012 | Drummond | G06F 3/023 235/379 |
| 2013/0205723 | A1* | 8/2013 | Blake | G07F 9/08 53/473 |
| 2014/0040085 | A1* | 2/2014 | Angus | G07D 11/12 705/35 |
| 2014/0290539 | A1* | 10/2014 | Tagashira | G07G 1/14 109/53 |
| 2015/0006351 | A1* | 1/2015 | Dickerson-Wright | G06Q 40/04 705/37 |

OTHER PUBLICATIONS

Golz, Earl, Rise in ATM fees seen Monday; Banks say surcharges are needed because operating money machines is costly, Austin American Statesman [Austin, Tex] Mar 31, 1996: D.1. (Year: 1996).*

* cited by examiner

TWO-PORTION CASH-DISPENSING MACHINES

CROSS-REFERENCE TO RELATED APPLICATIONS

This application claims the benefit of the filing dates of U.S. provisional application No. 62/286,995, filed on Jan. 26, 2016, and U.S. provisional application No. 62/322,818, filed on Apr. 15, 2016, the teachings of both of which are incorporated herein by reference in their entirety.

BACKGROUND

Field of the Invention

The present invention relates to cash-dispensing machines and, more specifically but not exclusively, to multi-function kiosks for casinos and other gaming enterprises.

Description of the Related Art

This section introduces aspects that may help facilitate a better understanding of the invention. Accordingly, the statements of this section are to be read in this light and are not to be understood as admissions about what is prior art or what is not prior art.

Many casinos and other gaming enterprises have multi-function electronic kiosks that enable users to perform different functions, such as ATM (automated teller machine) cash withdrawals, bill breaking, and voucher redemption. In some situations, such kiosks are operated by a third party, referred to as an ISO (independent service organization), but the casino is responsible for supplying the cash that is stored in the kiosk and dispensed to the users.

In an ATM cash-withdrawal operation, a user inserts his ATM or bank debit card into a kiosk and requests withdrawal of a specified amount of cash. The kiosk communicates with an (off-site) ATM network processor which processes the requested ATM transaction, during which funds are transferred from the user's bank account to the casino's bank account. After the ATM transaction is performed (in real time), the kiosk dispenses cash to the user equivalent to the requested withdrawal amount. For each such ATM cash-withdrawal operation, the user is typically charged a service fee that is debited from his bank account. In a typical business arrangement, the ISO and the casino each get a portion of the service fee, although the portions may be different for the ISO and the casino, depending on the negotiated arrangement.

In a bill-breaking operation, a user inserts a relatively large-denomination bill into a kiosk and, in return, the kiosk dispenses a number of smaller-denomination bills whose total monetary value is equal to that of the large-denomination bill. For example, if a user inserts a $100 bill into the kiosk, the kiosk may dispense five $20 bills in return. The user is typically not charged a service fee for such bill-breaking operations.

As used in this specification, a voucher is a piece of paper that has a monetary value associated with it. A TITO (ticket in, ticket out) ticket is a particular type of voucher. In a voucher-redemption operation, a user cashes out by inserting a voucher into the kiosk and, in return, the kiosk dispenses cash to the user equivalent to the monetary value associated with the voucher. Here, too, the user is typically not charged a service fee for such voucher-redemption operations.

Casino owners would prefer not to have to be responsible for maintaining the cash in the kiosks on their properties.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to certain embodiments of the invention, a multi-function cash-dispensing machine, such as a kiosk for casinos and other gaming enterprises, has two secured portions: a first (so-called casino) portion and a second (so-called ISO) portion. The interior of the casino portion is accessible only to individuals authorized by the casino, while the interior of the ISO portion is accessible only to individuals authorized by the ISO responsible for operating the two-portion kiosk. As used herein, the term "gaming enterprise" may refer to a single gaming location, such as an individual casino, or a number of different, affiliated gaming locations, such as a plurality of casinos owned or operated by the same company.

Like the prior-art kiosks described previously, two-portion kiosks according to some embodiments of the invention support (at least) the functions of ATM cash withdrawals, bill breaking, and voucher redemption. As described further below, the casino portion of such a two-portion kiosk receives and retains the incoming cash inserted by users during bill-breaking operations as well as the vouchers inserted by users during voucher-redemption operations, while the ISO portion stores and dispenses the outgoing cash associated with all three kiosk functions. Note that, in this case, the ISO and not the casino is responsible for maintaining the cash in the two-portion kiosk that is dispensed to users during any of the three different types of kiosk operations.

Figure 1:
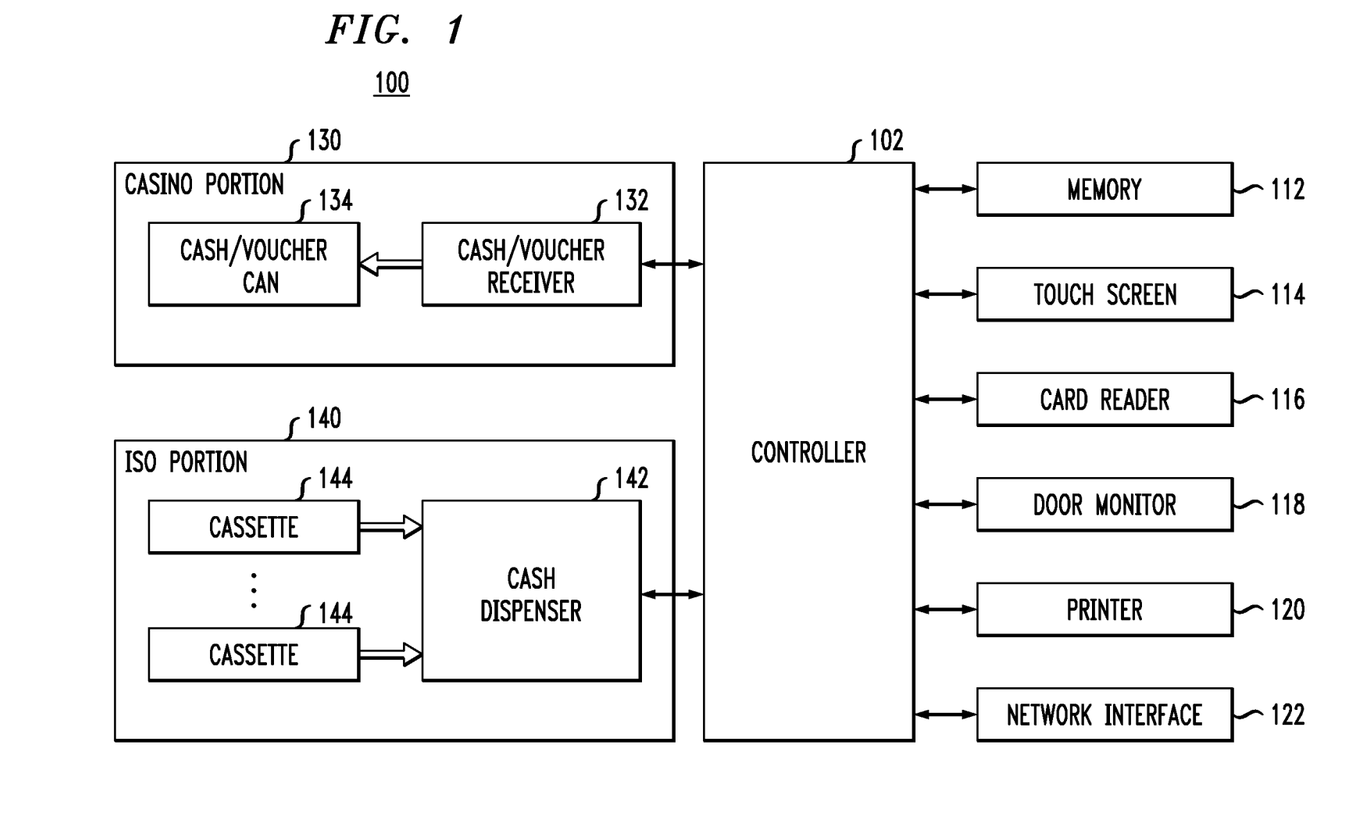
FIG. 1 is a high-level block diagram of a two-portion kiosk according to one embodiment of the invention.

FIG. 1 is a high-level block diagram of a two-portion kiosk 100 according to one embodiment of the invention. As shown in FIG. 1, two-portion kiosk 100 has the following elements configured to perform the following functions that support operations of kiosk 100:

Controller 102 configured to control all of the automated operations of kiosk 100;

Cash/voucher receiver 132 configured to receive paper currency and vouchers from the user and store them in the cash/voucher can 134;

Cash dispenser 142 configured to retrieve cash from the appropriate cash cassettes 144 and present the retrieved cash to the user;

Memory 112 configured to store software programs and data for the controller 102;

Touch screen 114 configured to display textual and graphical information to the user and to receive manual data inputs from the user;

Card reader 116 configured to receive and read the user's player card, credit/debit card, or identification card;

Door monitor 118 configured to detect and record access to the casino portion 130 of the kiosk 100 and to the ISO portion 140 of the kiosk 100;

Printer 120 configured to print receipts and vouchers for the user; and

Network interface 122 configured to enable the controller 102 to communicate with one or more other nodes (not shown), such as a centralized server, of a distributed casino network via wireless and/or wire-line communication links depending on the particular implementation and deployment. The network interface 122 also enables the controller 102 to communicate with remote nodes (not shown) outside of the casino network, such as an ATM network processor in order to request ACH (automated clearing house) transfers and receive confirmation of the completion of such ACH transfers.

The cash/voucher receiver 132 receives paper currency and vouchers from users and deposits them into the cash/voucher can 134. The receiver 132 identifies the denomination of each inserted item of paper currency (a.k.a. a note or bill), reads information from each inserted voucher, and transmits those denominations and information, as appropriate, to the controller 102.

Under the control of the controller 102, the cash dispenser 142 retrieves one or more items of paper currency from one or more of the cash cassettes 144, each provisioned to store paper currency of a specific denomination, and presents the item(s) to the user. For example, the ISO portion 140 may have six cash cassettes: one $1 cassette, two $5 cassettes, two $20 cassettes, and one $100 cassette. In certain embodiments, the cash dispenser 142 may be either a present-type cash dispenser that collects all of the bills from the appropriate cash cassettes 144 and presents them to the user as a single stack of bills or a dispense-type cash dispenser that sequentially retrieves from an appropriate cash cassette 144 and presents to the user one bill at a time.

As represented in FIG. 1, kiosk 100 has two secure portions: (1) a casino portion 130 having the cash/voucher receiver 132 and the cash/voucher can 134 and (2) an ISO portion 140 having the cash dispenser 142 and the cash cassettes 144. The casino portion 130 is physically located in a first locked compartment of the two-portion kiosk 100 that is accessible only by individuals authorized by the casino's management to have such access, while the ISO portion 140 is physically located in a second locked compartment of the two-portion kiosk 100 that is accessible only by individuals authorized by the ISO's management to have such access. The casino is responsible for retrieving and handling the cash and vouchers that accumulate in the cash/voucher can 134 located in the casino portion 130, while the ISO is responsible for refilling and/or replacing the cash cassettes 144 located in the ISO portion 140.

Figure 2:
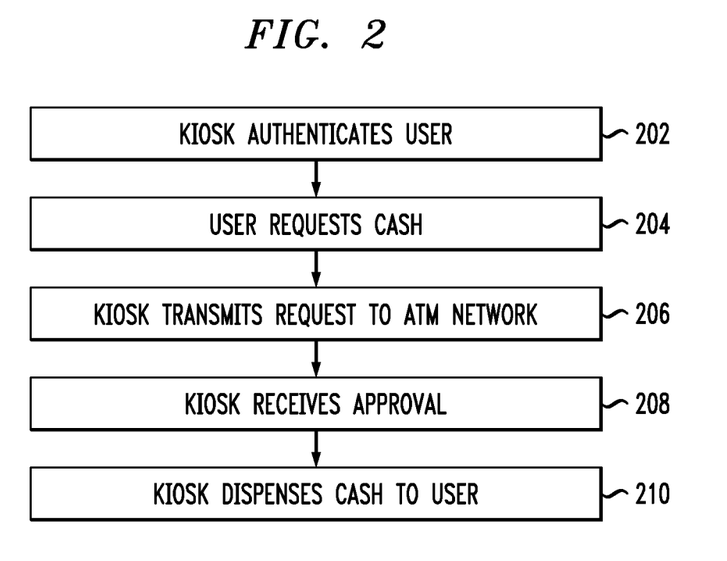
FIG. 2 is a flow diagram for the processing involved in an ATM cash-withdrawal operation according to one embodiment of the invention.

FIG. 2 is a flow diagram for the processing involved in an ATM cash-withdrawal operation according to one embodiment of the invention. The processing begins in step 202, where the kiosk 100 authenticates the user. This authentication process typically involves the card reader 116 receiving and reading the user's ATM or bank debit card and transmitting information read from the card to the controller 102, the controller 102 presenting instructions on the touch screen 114 for the user to input data, such as the user's PIN (personal identification number) code, using the touch screen 114, the touch screen 114 receiving and transmitting that inputted data to the controller 102, and the controller 102 determining whether the user's PIN code is correct.

Assuming that the authentication processing of step 202 is successful, processing continues to step 204, where the user uses the touch screen 114 to request withdrawal of a specified amount of cash. In step 206, the controller 102 receives the cash-withdrawal request from the touch screen 114 and communicates, via the network interface 122, with an (off-site) ATM network processor (not shown) which processes the requested ATM transaction using conventional processing, during which funds are transferred from the user's bank account to the ISO's bank account. Assuming that the ATM transaction is approved (in real time), in step 208, the controller 102 receives notice of that approval from the remote ATM network processor via the network interface 122 and, in step 210, the controller 102 instructs the cash dispenser 142 in the ISO portion 140 of the two-part kiosk 100 to retrieve from the cash cassettes 144 and present to the user the requested amount of money.

As in the prior art, for each such ATM cash withdrawal, the user is typically charged a service fee that is debited from his bank account. In this case, however, because the ISO is responsible for maintaining the outgoing cash in the two-portion kiosk 100, the ISO may be able to negotiate for a larger part of the service fee than in the prior-art situation in which the casino is responsible for maintaining the outgoing cash. Depending on the negotiated arrangement, the casino might even need to pay money to the ISO for operating a two-portion kiosk 100 at the casino.

Figure 3:
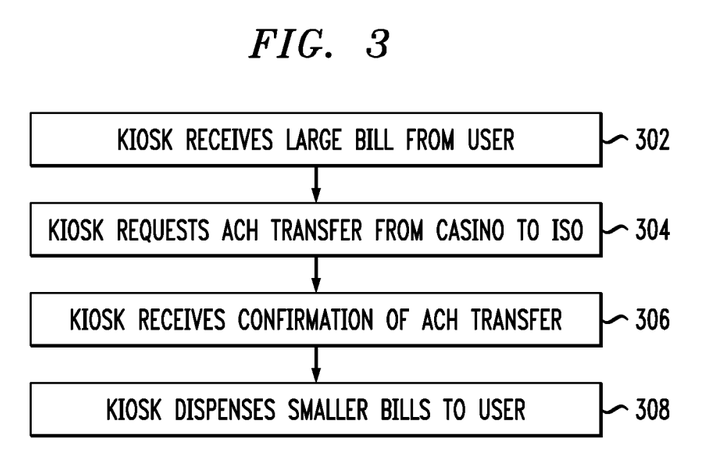
FIG. 3 is a flow diagram for the processing involved in a bill-breaking operation according to one embodiment of the invention involving real-time ACH transfers.

FIG. 3 is a flow diagram for the processing involved in a bill-breaking operation according to one embodiment of the invention involving real-time ACH transfers. The processing begins in step 302, where the user inserts a relatively large-denomination bill into the cash/voucher receiver 132 in the casino portion 130 of the two-portion kiosk 100. In particular, the receiver 132 receives the bill, determines the denomination of the bill, transmits that information to the controller 102, and deposits the bill into the case/voucher can 134.

Since the casino portion 130 has received the large-denomination bill, and the ISO portion 140 needs to dispense a number of smaller-denomination bills, in step 304, the kiosk 100 sends a request, via the network interface 122, to a banking network processor (not shown), for an ACH transfer from the casino's bank account to the ISO's bank account in order to cover the monetary value of the bill-breaking operation. In addition to covering the monetary value of the bill-breaking operation, the ISO may charge a negotiated fee to the casino for supporting that operation. In step 306, the kiosk 100 receives confirmation, via the network interface 122, from the banking network processor that the ACH transfer has been successfully completed. Note that, in some implementations, the receiver 132 holds the large-denomination bill until after the ACH transfer is successfully completed before depositing the bill into the can 134. In step 308, the controller 102 instructs the cash dispenser 142 in the ISO portion 140 of the two-portion kiosk 100 to retrieve from the cash cassettes 144 and present to the user a number of smaller-denomination bills of equal total monetary value to that of the large-denomination bill.

Figure 4:
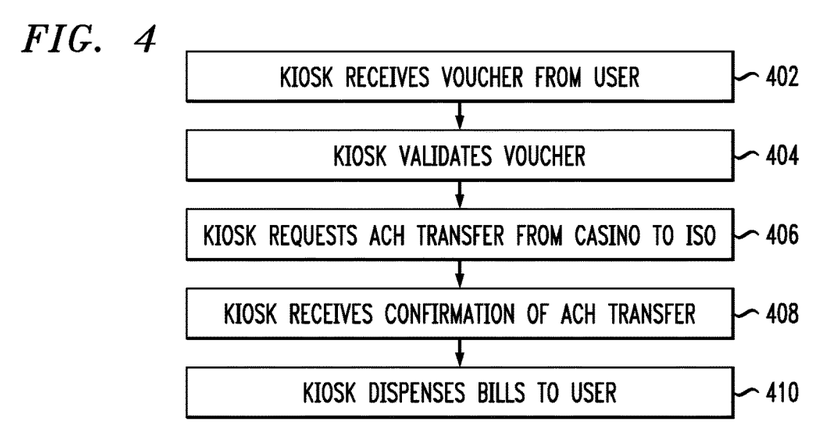
FIG. 4 is a flow diagram for the processing involved in a voucher-redemption operation according to one embodiment of the invention involving real-time ACH transfers.

FIG. 4 is a flow diagram for the processing involved in a voucher-redemption operation according to one embodiment of the invention involving real-time ACH transfers. The processing begins in step 402, where the user inserts a voucher into the cash/voucher receiver 132 in the casino portion 130 of the two-portion kiosk 100. In particular, the receiver 132 receives the voucher, reads information from the voucher, transmits that information to the controller 102, and deposits the voucher into the cash/voucher can 134. In step 404, the kiosk 100 validates the voucher. In a particular implementation in which the kiosk 100 is part of a distributed casino-based network (not shown), the controller 102 communicates, via network interface 122, with a centralized server (not shown) of the distributed network to verify that the voucher is valid and to determine the corresponding cash value associated with it. Note that, in other implementations, the kiosk 100 may be a stand-alone device that does not require any external assistance to validate the voucher.

Assuming that the voucher is valid, processing continues to step 406, where the kiosk 100 sends a request, via the network interface 122, to the banking network processor (not shown), for an ACH transfer from the casino's bank account to the ISO's bank account in order to cover the monetary value of the voucher-redemption operation. In addition to covering the monetary value of the voucher-redemption operation, here, too, the ISO may charge a negotiated fee to the casino for supporting that operation. In step 408, the kiosk 100 receives confirmation, via the network interface 122, from the banking network processor that the ACH transfer has been successfully completed.

In step 410, the kiosk 100 dispenses the cash value of the voucher to the user. In particular, the controller 102 instructs the cash dispenser 142 in the ISO portion 140 of the two-portion kiosk 100 to retrieve from the cash cassettes 144 and present to the user one or more bills having a total monetary value equal to the cash value of the voucher.

In the embodiments shown in FIGS. 3 and 4, the ACH transfers associated with the bill-breaking operation of FIG. 3 and the voucher-redemption operation of FIG. 4 occur in real-time. In particular, for each bill-breaking or voucher-redemption operation, the controller 102 of the kiosk 100 initiates an ACH transfer that is completed for the monetary value of that kiosk operation prior to the ISO portion 140 of the two-part kiosk 100 dispensing cash to the user.

In alternative embodiments, ACH transfers are implemented ahead of time as part of a funding operation, before any bill-breaking or voucher-redemption operations are performed. In particular, based on pre-approved arrangements between the casino and the ISO, the casino requests an ACH transfer for a relatively large amount of funds to be transferred from the casino's bank account to the ISO's bank account. When a bill-breaking or voucher-redemption operation subsequently occurs, the casino debits the corresponding monetary value from the funded balance. In particular, when a bill-breaking or voucher-redemption operation is performed, based on information transmitted by the controller 102 via the network interface 122 to the casino-network server, the funded balance is debited by the amount of cash dispensed to the user, leaving a reduced balance for subsequent bill-breaking or voucher-redemption operations. When the casino determines that the balance is completely or almost completely expended, the casino can request another funding ACH transfer to replenish the balance.

Figure 5:
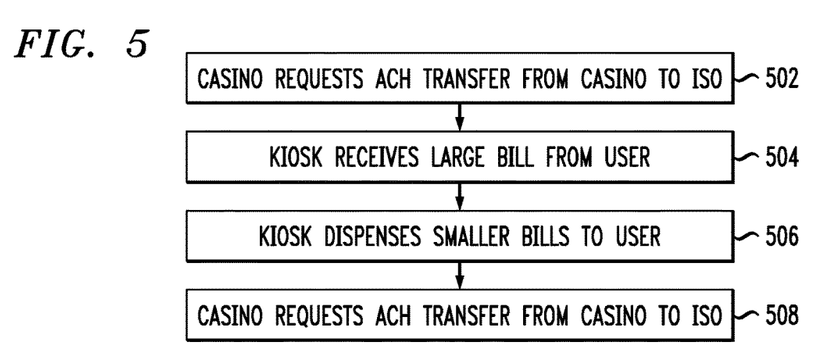
FIG. 5 is a flow diagram for the processing involved in a bill-breaking operation according to one embodiment of the invention involving non-real-time ACH transfers.

FIG. 5 is a flow diagram for the processing involved in a bill-breaking operation according to one embodiment of the invention involving non-real-time ACH transfers. The processing begins in step 502, where the casino requests a relatively large ACH transfer from the casino's bank account to the ISO's bank account. At some later time, one or more users perform one or more bill-breaking operations at one or more different two-portion kiosks, similar to kiosk 100 of FIG. 1, in the casino. Each bill-breaking operation involves an instance of steps 504 and 506 of FIG. 5, which are similar to steps 302 and 308 of FIG. 3. The casino keeps track of the funded balance and, when appropriate, in step 508, the casino requests another ACH transfer from the casino's bank account to the ISO's bank account to replenish the balance.

Figure 6:
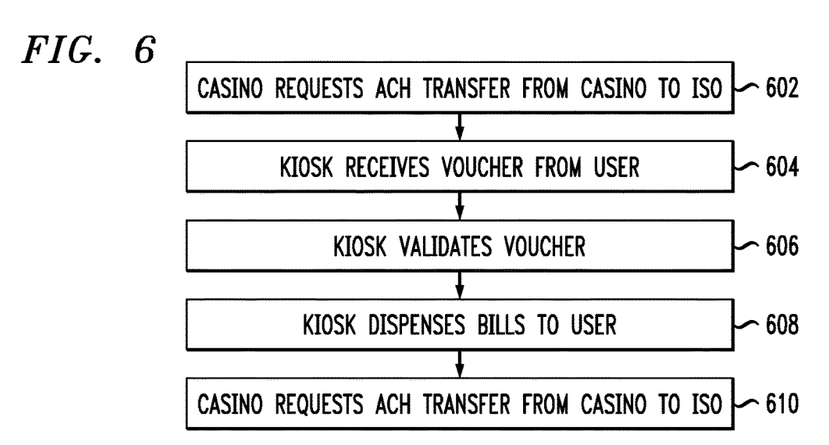
FIG. 6 is a flow diagram for the processing involved in a voucher-redemption operation according to one embodiment of the invention involving non-real-time ACH transfers.

FIG. 6 is a flow diagram for the processing involved in a voucher-redemption operation according to one embodiment of the invention involving non-real-time ACH transfers. The processing begins in step 602, where the casino requests a relatively large ACH transfer from the casino's bank account to the ISO's bank account. At some later time, one or more users perform one or more voucher-redemption operations at one or more different two-portion kiosks, similar to kiosk 100 of FIG. 1, in the casino. Each voucher-redemption operation involves an instance of steps 604-608 of FIG. 6, which are similar to steps 402-410 of FIG. 3. The casino keeps track of the funded balance and, when appropriate, in step 610, the casino requests another ACH transfer from the casino's bank account to the ISO's bank account to replenish the balance.

Note that, in some implementations, a single funded balance is used for both bill-breaking operations and voucher-redemption operations. In other implementations, two separate balances may be maintained: one for each of those two different types of kiosk operations.

In the implementations shown in FIGS. 5 and 6, the casino keeps track of the funded balance(s) and determines when to request the ACH transfers. In alternative implementations, the ISO performs those functions.

In the implementations of FIGS. 3 and 4, there is an ACH transfer during each bill-breaking operation and each voucher-redemption operation that is completed before any money is dispensed to the user. In the implementations of FIGS. 5 and 6, there is an ACH transfer that occurs before any bill-breaking and/or voucher-redemption operations are performed, where that ACH transfer is typically large enough to fund a number of subsequent bill-breaking and/or voucher-redemption operations. Furthermore, if and when the funded amount is substantially or completely depleted, another ACH transfer can be performed to fund additional bill-breaking and/or voucher-redemption operations, and so on. In still other implementations, the initial ACH transfer of FIGS. 5 and 6 is omitted, and ACH transfers are performed after the fact to reimburse the ISO for one or more previous bill-breaking and/or voucher-redemption operations.

Although the invention has been described in the context of funding operations implemented using ACH transfers, other suitable types of funding operations are possible such as paper checks, electronic checks, Check 21 transactions, legal promissory notes, pre-funded retainers, etc. Note that, depending on the type, a funding operation may be performed well in advance of a bill-breaking or voucher-redemption operation, just before a bill-breaking or voucher-redemption operation, or even after a bill-breaking or voucher-redemption operation.

Some jurisdictions require certain gaming enterprises to ensure that an individual meets certain criteria before dispensing a voucher to that individual. For bars or other locations with slot machines or other gaming machines, some states may require each such gaming enterprise to ensure that, for example, the individual is old enough to gamble, that the individual is not a fugitive criminal, and/or that the individual is not delinquent on his or her taxes, child support payments, mortgage payments, or other financial obligations. To satisfy those requirements, in some embodiments of the invention, a kiosk, such as (but not limited to) a two-portion kiosk, is configured to qualify individuals in real time. For example, the kiosk may be able to receive a driver's license or other suitable identification card from an individual, such that the kiosk can determine, in real time and perhaps with the assistance of other network nodes, whether that individual is qualified to gamble before dispensing a gaming voucher to the individual.

Some jurisdictions require individuals to pay taxes for their gambling winnings. In some embodiments of the invention, a kiosk, perhaps with the assistance of other network nodes, is capable of withholding taxes and/or commissions before dispensing cash or otherwise assigning credit to an individual during a voucher-redemption operation. Back-end processing by the network can ensure that the appropriate entities and parties receive the appropriate funds corresponding to those withheld taxes and/or commissions.

In some embodiments, a kiosk can generate W-2g forms (or other appropriate forms) as part of the network processing for a single event exceeding a one-time limit, e.g., a single jackpot greater than a specified threshold value that a taxing authority considers to be a taxable event. In that case, the gaming machine (e.g., a slot machine) would be configured to generate a corresponding jackpot voucher. In addition, the kiosk could be configured to require, for example, the individual to insert his/her driver's license, enter his/her social security number, and provide a signature, where the kiosk, perhaps with the assistance of other network nodes, validates the submitted information and the signature and, if appropriate, emails, prints, or otherwise produces a W-2g form for the individual. In another implementation, an employee of the gaming enterprise could generate a W-2g form for the individual to sign and then, after the employee has received the executed W-2g form from the individual, manually authorize the kiosk to continue the corresponding voucher-redemption operation.

Although the invention has been described in the context of kiosks for casinos and other gaming enterprises, the invention is not so limited. In theory, some embodiments of the invention can be implemented for any two-portion cash-dispensing machine, where (i) a first portion of the two-portion machine is configured to dispense paper currency and is controlled by a first entity and (ii) a second portion of the two-portion machine is configured to receive paper currency and/or vouchers and is controlled by a second entity different from the first entity.

Although the invention has been described in the context of two-portion cash-dispensing machines that support ATM cash-withdrawal operations, bill-breaking operations, and voucher-redemption operations, the invention is not so limited. The invention can be implemented in the context of cash-dispensing machines that perform bill-breaking, but not voucher-redemption operations with or without supporting ATM cash-withdrawal operations as well as cash-dispensing machines that perform voucher-redemption, but not bill-breaking operations with or without supporting ATM cash-withdrawal operations. The invention can also be implemented in the context of teller stations that support cash-access operations with or without an associated bank fee. A cash-access operation provides access to cash when a bank is closed. The invention can also be implemented in the context of kiosks that support jackpot-processing operations, for which casinos have access to funds for jackpot payments via cash as a service, pay as you go, or just in time cash access for a fee. The invention can also be implemented in the context of kiosks that support "pay-to-use-cash" operations provided by the ISO, where the casino purchases needed cash from the ISO on the spot for a fee. The invention can also be implemented in the context of cash-dispensing machines that support "cashier fill" operations provided by the ISO.

In some embodiments, the invention is a cash-dispensing machine comprising a first secure portion configured to receive at least one of (i) paper currency and (ii) vouchers; a second secure portion configured to dispense paper currency; and a controller configured to communicate with the first and second secure portions to control operations of the machine. The first secure portion is configured such that physical access to the first secure portion is restricted to one or more authorized first agents; the second secure portion is configured such that physical access to the second secure portion is restricted to one or more authorized second agents; and the first and second secure portions are configured to be independently accessible such that (i) physical access to the first secure portion by an authorized first agent does not inherently provide physical access to the second secure portion by the authorized first agent and (ii) physical access to the second secure portion by an authorized second agent does not inherently provide physical access to the first secure portion by the authorized second agent.

In some embodiments, the machine supports ATM cash-withdrawal operations. For an ATM cash-withdrawal operation by a user, the controller determines that the user is entitled to receive a requested monetary amount associated with the ATM cash-withdrawal operation, the controller requests a transfer of funds from a bank account associated with the user, and the controller instructs the second secure portion to dispense to the user paper currency corresponding to the requested monetary amount.

In some embodiments, a first business entity is responsible for maintaining the first secure portion of the machine; a second business entity, independent of the first business entity, is responsible for maintaining the second secure portion of the machine; the requested transfer of funds is from the user's bank account to a bank account for the second business entity; the user is charged a service fee for the ATM cash-withdrawal operation; the first business entity receives a first portion of the service fee; and the second business entity receives a second portion of the service fee.

In some embodiments, the machine supports bill-breaking operations. For a bill-breaking operation by a user, the first secure portion receives an incoming item of paper currency from the user, and the controller instructs the second secure portion to dispense to the user two or more smaller, outgoing items of paper currency corresponding to the monetary value of the incoming item.

In some embodiments, a first business entity is responsible for maintaining the first secure portion of the machine; a second business entity, independent of the first business entity, is responsible for maintaining the second secure portion of the machine; and the controller is configured to request a transfer of funds from a bank account of the first business entity to a bank account of the second business entity to fund the second business entity for the bill-breaking operation.

In some embodiments, the transfer of funds is contemporaneous with the bill-breaking operation, and the controller communicates information associated with a request for the transfer of funds.

In some embodiments, the controller receives confirmation of the transfer of funds before dispensing the two or more smaller, outgoing items of paper currency to the user.

In some embodiments, the transfer of funds occurs prior to the bill-breaking operation, and the controller is configured to communicate information associated with the bill-breaking operation to update a balance associated with the funds to determine when to request another transfer of funds from the bank account of the first business entity to the bank account of the second business entity to fund the second business entity for one or more subsequent bill-breaking operations.

In some embodiments, the transfer of funds occurs after the bill-breaking operation, and the controller is configured to communicate information associated with the bill-breaking operation to request the transfer of funds.

In some embodiments, the machine is configured to support voucher-redemption operations. For a voucher-redemption operation by a user, the first secure portion receives a voucher from the user, and the controller instructs the second secure portion to dispense to the user paper currency corresponding to a monetary value associated with the voucher.

In some embodiments, a first business entity is responsible for maintaining the first secure portion of the machine; a second business entity, independent of the first business entity, is responsible for maintaining the second secure portion of the machine; and the controller is configured to request a transfer of funds from a bank account of the first business entity to a bank account of the second business entity to fund the second business entity for the voucher-redemption operation.

In some embodiments, the transfer of funds is contemporaneous with the voucher-redemption operation, and the controller is configured to communicate information associated with a request for the transfer of funds.

In some embodiments, the controller receives confirmation of the transfer of funds before dispensing the paper currency to the user.

In some embodiments, the transfer of funds occurs prior to the voucher-redemption operation, and the controller is configured to communicate information associated with the voucher-redemption operation to update a balance associated with the funds to determine when to request another transfer of funds from the bank account of the first business entity to the bank account of the second business entity to fund the second business entity for one or more subsequent voucher-redemption operations.

In some embodiments, the transfer of funds occurs after the voucher-redemption operation, and the controller communicates information associated with the voucher-redemption operation to request the transfer of funds.

In some embodiments, the controller assists in validating that a user is authorized to engage in gambling activities.

In some embodiments, the machine is connected to a network of a gaming enterprise, and the controller assists in generating a form associated with a taxing authority and corresponding to money won by a user of the machine.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A cash-dispensing machine comprising:
a first secure portion configured to receive at least one of (i) paper currency and (ii) vouchers;
a second secure portion configured to dispense paper currency; and
a controller configured to communicate with the first and second secure portions to control operations of the machine, wherein:
the first secure portion is configured such that physical access to the first secure portion is restricted to one or more authorized first agents of a first business entity;
the second secure portion is configured such that physical access to the second secure portion is restricted to one or more authorized second agents of a second business entity independent of the first business entity; and
the first and second secure portions are configured to be independently accessible such that (i) physical access to the first secure portion by an authorized first agent does not provide physical access to the second secure portion by the authorized first agent and (ii) physical access to the second secure portion by an authorized second agent does not provide physical access to the first secure portion by the authorized second agent;
the machine is configured to support cash-withdrawal operations; and
for a cash-withdrawal operation by a user:
the controller determines that the user is entitled to receive a requested monetary amount associated with the cash-withdrawal operation;
the controller requests a transfer of funds from a bank account associated with the user; and
the controller instructs the second secure portion to dispense to the user paper currency corresponding to the requested monetary amount;
the first business entity is responsible for maintaining the first secure portion of the machine;
the second business entity is responsible for maintaining the second secure portion of the machine;
the requested transfer of funds is from the user's bank account to a bank account for the second business entity;
the user is charged a service fee for the cash-withdrawal operation;
the first business entity receives a first portion of the service fee; and
the second business entity receives a second portion of the service fee.

2. The machine of claim 1, wherein:
the machine is configured to support bill-breaking operations; and
for a bill-breaking operation by a user:
the first secure portion receives an incoming item of paper currency from the user; and
the controller instructs the second secure portion to dispense to the user two or more smaller, outgoing items of paper currency corresponding to the monetary value of the incoming item.

3. The machine of claim 2, wherein:
the controller is configured to request a transfer of funds from a bank account of the first business entity to a bank account of the second business entity to fund the second business entity for the bill-breaking operation.

4. The machine of claim 3, wherein:
the transfer of funds is contemporaneous with the bill-breaking operation; and
the controller is configured to communicate information associated with a request for the transfer of funds.

5. The machine of claim 4, wherein the controller is configured to receive confirmation of the transfer of funds before dispensing the two or more smaller, outgoing items of paper currency to the user.

6. The machine of claim 3, wherein:
the transfer of funds occurs prior to the bill-breaking operation; and
the controller is configured to communicate information associated with the bill-breaking operation to update a balance associated with the funds to determine when to request another transfer of funds from the bank account of the first business entity to the bank account of the second business entity to fund the second business entity for one or more subsequent bill-breaking operations.

7. The machine of claim 3, wherein:
the transfer of funds occurs after the bill-breaking operation; and
the controller is configured to communicate information associated with the bill-breaking operation to request the transfer of funds.

8. The machine of claim 1, wherein:
the machine is configured to support voucher-redemption operations; and
for a voucher-redemption operation by a user:
the first secure portion receives a voucher from the user; and
the controller instructs the second secure portion to dispense to the user paper currency corresponding to a monetary value associated with the voucher.

9. The machine of claim 8, wherein:
the controller is configured to request a transfer of funds from a bank account of the first business entity to a bank account of the second business entity to fund the second business entity for the voucher-redemption operation.

10. The machine of claim 9, wherein:

the transfer of funds is contemporaneous with the voucher-redemption operation; and the controller is configured to communicate information associated with a request for the transfer of funds.

11. The machine of claim 10, wherein the controller is configured to receive confirmation of the transfer of funds before dispensing the paper currency to the user.

12. The machine of claim 9, wherein:

the transfer of funds occurs prior to the voucher-redemption operation; and the controller is configured to communicate information associated with the voucher-redemption operation to update a balance associated with the funds to determine when to request another transfer of funds from the bank account of the first business entity to the bank account of the second business entity to fund the second business entity for one or more subsequent voucher-redemption operations.

13. The machine of claim 9, wherein:

the transfer of funds occurs after the voucher-redemption operation; and the controller is configured to communicate information associated with the voucher-redemption operation to request the transfer of funds.

14. The machine of claim 1, wherein the controller is configured to assist in validating that a user is authorized to engage in gambling activities.

15. The machine of claim 1, wherein:

the machine is configured to be connected to a network of a gaming enterprise; and the controller is configured to assist in generating a form associated with a taxing authority and corresponding to money won by a user of the machine.

* * * * *